US010316398B2

(12) United States Patent
Plett et al.

(10) Patent No.: US 10,316,398 B2
(45) Date of Patent: Jun. 11, 2019

(54) HIGH-TENSILE BRASS ALLOY AND ALLOY PRODUCT

(71) Applicant: Otto Fuchs Kommanditgesellschaft, Meinerzhagen (DE)

(72) Inventors: Thomas Plett, Schmallenberg (DE); Hermann Gummert, Viersen (DE); Björn Reetz, Krefeld (DE)

(73) Assignee: OTTO FUCHS KOMMANDITGESELLSCHAFT, Meinerzhagen (DE)

(*) Notice: Subject to any disclaimer, the term of this patent is extended or adjusted under 35 U.S.C. 154(b) by 234 days.

(21) Appl. No.: 15/300,234

(22) PCT Filed: May 13, 2015

(86) PCT No.: PCT/EP2015/060566
§ 371 (c)(1),
(2) Date: Sep. 28, 2016

(87) PCT Pub. No.: WO2015/173291
PCT Pub. Date: Nov. 19, 2015

(65) Prior Publication Data
US 2017/0145549 A1 May 25, 2017

(30) Foreign Application Priority Data
May 16, 2014 (DE) .................. 10 2014 106 933

(51) Int. Cl.
*C22F 1/08* (2006.01)
*C22C 9/04* (2006.01)
*F16C 33/12* (2006.01)
*B21C 1/00* (2006.01)

(52) U.S. Cl.
CPC .............. *C22F 1/08* (2013.01); *B21C 1/003* (2013.01); *C22C 9/04* (2013.01); *F16C 33/12* (2013.01); *F16C 33/121* (2013.01); *F16C 2204/10* (2013.01); *F16C 2204/14* (2013.01); *F16C 2360/24* (2013.01)

(58) Field of Classification Search
None
See application file for complete search history.

(56) References Cited

U.S. PATENT DOCUMENTS

| | | | |
|---|---|---|---|
| 2,870,051 A | 1/1959 | Klement | |
| 3,923,500 A | 12/1975 | Kitazawa et al. | |
| 4,874,439 A * | 10/1989 | Akutsu | C22C 9/04 |
| | | | 420/479 |
| 4,995,924 A * | 2/1991 | Akutsu | C22C 9/04 |
| | | | 420/471 |
| 5,114,468 A * | 5/1992 | Akutsu | C22C 1/0425 |
| | | | 75/234 |
| 5,183,637 A * | 2/1993 | Tanaka | C22C 9/04 |
| | | | 420/479 |
| 5,326,646 A | 7/1994 | Nakashima et al. | |
| 5,337,872 A | 8/1994 | Kawamura et al. | |
| 7,214,279 B2 | 5/2007 | Fischer et al. | |
| 8,388,776 B2 | 3/2013 | Buscher et al. | |
| 8,435,361 B2 * | 5/2013 | Gaag | C22C 9/04 |
| | | | 420/471 |
| 2005/0115645 A1 | 6/2005 | Fischer et al. | |
| 2008/0219881 A1 * | 9/2008 | Gaag | C22C 9/04 |
| | | | 420/471 |
| 2008/0240973 A1 | 10/2008 | Gaag et al. | |
| 2009/0022620 A1 | 1/2009 | Weber | |
| 2009/0092517 A1 | 4/2009 | Kosaka et al. | |
| 2011/0211781 A1 * | 9/2011 | Toda | F16C 33/121 |
| | | | 384/416 |
| 2012/0020600 A1 | 1/2012 | Nishimura et al. | |
| 2013/0330227 A1 * | 12/2013 | Gaag | C22C 9/04 |
| | | | 420/479 |
| 2014/0166161 A1 | 6/2014 | Terlinde et al. | |
| 2014/0259674 A1 * | 9/2014 | Zhu | C22C 9/04 |
| | | | 420/471 |
| 2016/0348215 A1 * | 12/2016 | Gummert | C22C 9/04 |
| 2017/0051385 A1 * | 2/2017 | Gummert | C22F 1/08 |

FOREIGN PATENT DOCUMENTS

| | | |
|---|---|---|
| CH | 223580 A | 9/1942 |
| CN | 101709405 A | 5/2010 |
| CN | 102251142 A | 11/2011 |
| CN | 103589903 A | 2/2014 |
| CN | 103602998 A | 2/2014 |
| DE | 1558817 A1 | 4/1970 |
| DE | 1558467 A1 | 7/1970 |
| DE | 19908107 A1 | 8/2000 |

(Continued)

OTHER PUBLICATIONS

English translation of CH 223580, Dec. 1942; 4 pages.*
International Search Report in parent case PCT/EP2015/060566 dated Dec. 23, 2015.
Written Opinion of the International Searching Authority in parent case PCT/EP2015/060566 dated Dec. 23, 2015.
Zhang Sheng-Hua et al: "Microstructure and wear properties of some special brasses", Jixie Gongcheng Cailao—Materials for Mechanical Engineering. Jixie Gongyebu Shanghai Cailiao Yanjiusuo. Shanghai. CN. vol. 28. No. 6. Jun. 30, 2004 (Jun. 30, 2004). pp. 35-38. XP009175887. ISSN: 1000-3738. Entire article.
Unpublished U.S. Appl. No. 15/104,437, filed Jun. 14, 2016.
Unpublished U.S. Appl. No. 15/119,073, filed Aug. 15, 2016.
Anonym: "Kupfer-Aluminium-Legierungen. 1-15 Auflage Mar. 2010". Deutsches Kupferinstitut, Oct. 1, 2010. XP002742081. Dusseldorf. 28 pages. Entire article.

(Continued)

*Primary Examiner* — Helene Klemanski
(74) *Attorney, Agent, or Firm* — Polson Intellectual Property Law P.C.; Christopher Sylvain; Margaret Polson

(57) ABSTRACT

The invention relates to a high-tensile brass alloy comprising 58-66 wt % Cu; 1.6-7 wt % Mn; 0.2-6 wt % Ni; 0.2-5.1 wt % Al; 0.1-3 wt % Si; ≤1.5 wt % Fe; ≤0.5 wt % Sn; ≤0.5 wt % Pb; and the remainder Zn together with unavoidable impurities. Also described are a high-tensile brass product with such an alloy composition, and a method for manufacturing such a product made of a high-tensile brass alloy.

4 Claims, 6 Drawing Sheets

(56) References Cited

FOREIGN PATENT DOCUMENTS

| EP | 0407596 | A1 | 1/1991 |
|---|---|---|---|
| EP | 1712648 | A2 | 10/2006 |
| JP | 56-127741 | | 10/1981 |
| JP | 2001355029 | A | 12/2001 |
| JP | 2009007673 | A | 1/2009 |
| WO | 2004003244 | A1 | 1/2004 |

OTHER PUBLICATIONS

Office action dated Oct. 11, 2017 in related Chinese patent application 201580025319.2.
Office action dated Jan. 25, 2018 in related Russian patent application 2016139153.
European search report dated Oct. 27, 2017 in related application EP 17177780.8, which is a divisional of EP 15725263.6.
Weber K et al: "Neuer Pb-freier 1,2,5 Kupferwerkstoff fuer Gleitlageranwendungen in Verbrennungsmotoren und Getrieben", Metall : Fachzeitschrift Für Metallurgie; Technik, Wissenschaft, WIRTSC, GDMB-VERAG, Clausthal-Zellerfeld, DE, Bd. 63, Nr. 11, Nov. 1, 2009 (Nov. 1, 2009), Seiten 564-567, XP009157102, ISSN: 0026-0746. 4 pages.
Kurbatkin I I et al: "Effect of 1-5composition on the structure and properties of complex brasses used in the automotive industry", Cvetnye Metally (Tsvetnye Meta, Moskva : GOS. Ob'Edinnoe Nauä No-Techniä Eskoe Izdat, Nr. 3, Jan. 1, 1994 (Jan. 1, 1994), Seiten 44-46, XP009186304, ISSN: 0372-2929. 4 pages.
Office action dated Apr. 5, 2018 in related Korean application 10-2016-7029668.
Office action dated Jan. 9, 2018 in related Japanese patent application 2016-567567.
Metals Handbook (Rev. 4th edition), The Japan Institute of Metals and Materials (Ed.), 1982, p. 933.
European search report dated Nov. 3, 2017 in related application EP 17177799.8, which is a divisional of EP 15725263.6.
Second office action dated Jul. 12, 2018 in related Chinese application 201580025319.2.
Examination report dated Nov. 28, 2017 in related Korean application 10-2016-7029668.

\* cited by examiner

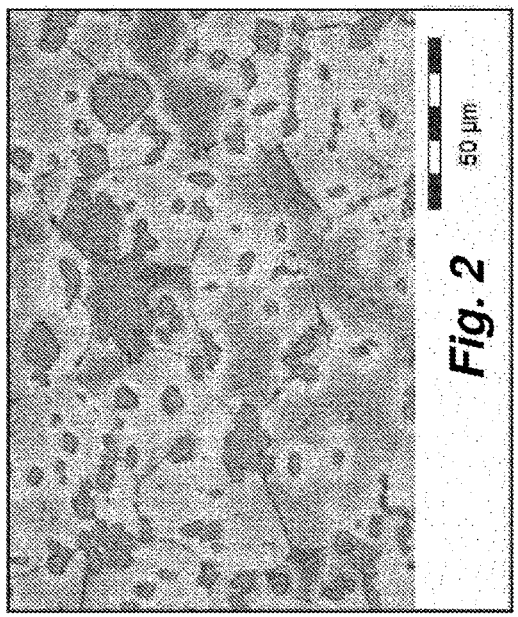
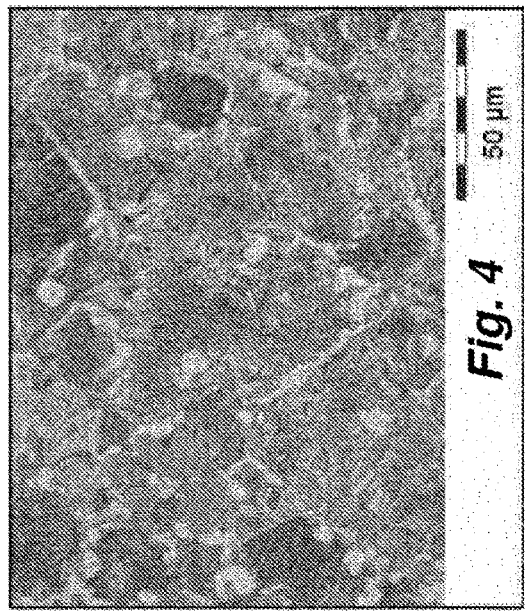
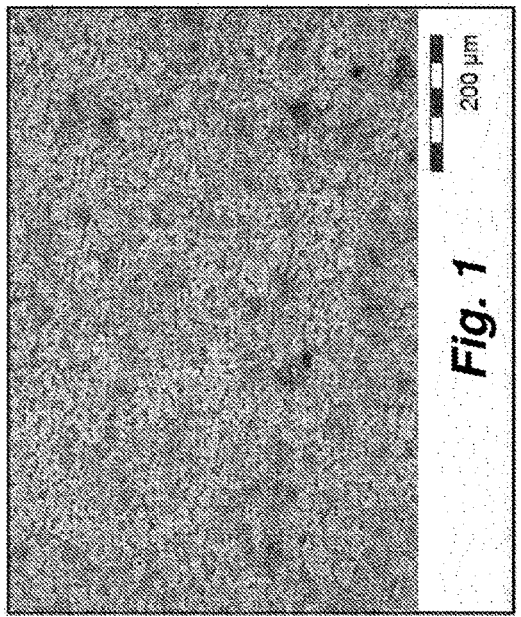
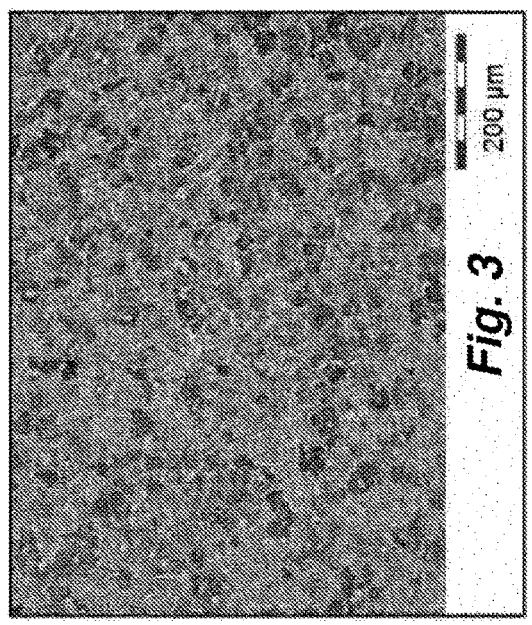

HIGH-TENSILE BRASS ALLOY AND ALLOY PRODUCT

CROSS-REFERENCE TO RELATED APPLICATIONS

This application claims priority to DE 10 2014 106933.1 filed May 16, 2014 through PCT/EP2015/060566 filed May 13, 2015.

BACKGROUND OF THE INVENTION

The invention relates to a high-tensile brass alloy and a product, made of a high-tensile brass alloy, which is subjected to friction load.

For typical friction applications in a lubricant environment, alloys generally require low coefficients of friction. In addition, the coefficient of friction should be adaptable within predefined limits to the particular application, in particular the friction partner, the lubricant used, and the friction conditions, such as contact pressure and relative speed. This is true in particular for piston sleeves, which are acted on by high static and dynamic loads. In addition, applications with high relative speeds of the friction partners, as in axial bearings of a turbocharger, for example, require alloys which in addition to reduced heat generation also ensure good heat dissipation from the friction surface.

The friction power and the oil contact result in a tribological layer which has accumulated lubricant components on the bearing surface. A uniform, high deposition rate of the lubricant components and their breakdown products is necessary in order to obtain a sufficiently stable adsorption layer on the sliding layer.

A suitable bearing material is additionally characterized by wide-ranging oil tolerance, so that the structure of the tribological layer is largely insensitive to the selection of certain oil additives. A further objective is to provide an alloy for friction applications with good emergency running properties, so that a sufficient service life under dry friction conditions may be ensured.

For components under friction load, it is also important that the alloy used has sufficient strength. Accordingly, a high 0.2% yield strength should be present in order to minimize plastic deformations that occur under load. In addition, it is necessary to provide a particularly hard, high tensile strength alloy in order to increase the resistance of the alloy to abrasive and adhesive stresses. At the same, there must be sufficient toughness as protection against impact stresses. In this regard, it is necessary to reduce the number of microdefects and retard the resulting defect growth. This is accompanied by the requirement of providing an alloy having a preferably high fracture toughness which is largely free of internal stresses.

In many cases, suitable alloys for parts under friction load are special brasses, which in addition to copper and zinc as the primary components are alloyed with at least one of the elements nickel, iron, manganese, aluminum, silicon, titanium, or chromium. Silicon brasses in particular meet the requirements stated above; CuZn31Si1 represents a standard alloy for friction applications such as piston sleeves. Furthermore, it is known to use tin bronzes, which in addition to tin and copper additionally contain nickel, zinc, iron, and manganese, for friction applications or also for mining.

Reference is made to CH 223 580 A as an example of a copper-zinc alloy that is suitable for machine parts under stress from sliding, such as bearings, worm gears, gearwheels, slide shoes, and the like. The cited document discloses a copper content of 50-70 wt %, alloyed with 2-8 wt % aluminum, 0.05-3% silicon, and 0.5-10 wt % manganese, and the remainder zinc. In addition, the alloy may contain up to a maximum of 10 wt % lead as well as 0.1-5 wt % of one or more elements of the group comprising iron, nickel, and cobalt. Furthermore, a high-tensile brass alloy is known from EP 0 407 596 B1 which in addition to copper, zinc, manganese, aluminum, and silicon contains iron, nickel, and cobalt as optional alloy components. In addition, a content of 0.03-1 wt % oxygen is provided. Moreover, DE 15 58 467 A discloses another high-tensile brass alloy which is provided for objects under stress from sliding and friction. In addition to copper and a zinc content which may be as high as 45 wt %, alloy additives of manganese, silicon, and tellurium are present. In addition, Fe, Ni, Al, and Be represent further optional alloy components. Furthermore, DE 15 58 817 B2 and DE 101 59 949 01 describe copper alloys with a wide-ranging composition which form a reduced-wear bearing material.

To achieve certain properties of a product that is manufactured from a high-tensile brass alloy, alloys containing different alloy elements are used. Thus, for components of this type it is necessary to keep such different products in stock, and in particular to also be able to work with these various alloys.

The foregoing examples of the related art and limitations therewith are intended to be illustrative and not exclusive. Other limitations of the related art will become apparent to those of skill in the art upon a reading of the specification and a study of the drawings.

BRIEF SUMMARY

The following embodiments and aspects thereof are described and illustrated in conjunction with systems, tools and methods which are meant to be exemplary and illustrative, not limiting in scope. In various embodiments, one or more of the above described problems have been reduced or eliminated, while other embodiments are directed to other improvements.

Against this background, an object of the invention is to propose a base high-tensile brass alloy from which not only may products be manufactured which are characterized by high strength, improved wear under friction load, and good emergency running properties when there is inadequate lubrication, but also from which alloys may be formed solely by varying the contents of the alloy elements of such a base alloy, without the need for additional alloy elements, and whose products have a wide variety of properties. A further aim is to provide a manufacturing method for the alloy and for a product made of a high-tensile brass alloy.

One embodiment of a high-tensile brass alloy according to the present disclosure contains the following alloy components:

58-66 wt % Cu;
1.6-7 wt % Mn;
0.2-6 wt % Ni;
0.2-5.1 wt % Al;
0.1-3 wt % Si;
≤1.5 wt % Fe;
≤0.5 wt % Sn;
≤0.5 wt % Pb;
and the remainder Zn together with unavoidable impurities.

For high-tensile brasses having the above-mentioned alloy composition, a surprising adaptability to the particular friction application present has been identified. The wear properties and emergency running properties are variably settable, whereby hard phases in the form of aluminides and silicides are present in the alloy which are selectable over a wide range with respect to the composition, average size, shape, and distribution in the alloy structure. This is achieved solely by varying the particular content of the alloy elements involved in the base alloy, in particular within relatively narrow limits.

The base alloy has a relatively high Zn content, preferably between 20 and 35 wt %. This is noteworthy, since the Cu content of 58 to 66 wt % is selected within a narrow range. To provide alloys having the particular different properties desired, the proportion of the Cu equivalent is selected to be relatively high, typically between 45 and 65 wt %. Thus, the particular alloy and therefore the properties of the product manufactured therefrom is/are set by varying the elements involved with the Cu equivalent. In this regard, the elements Mn, Ni, Al, and Si are of primary importance. By varying the involvement of these elements in the high-tensile brass alloy, for example, the proportion of the α and β phases in the matrix may be adjusted. Alloys may thus be formed by appropriately varying these elements, the products of the alloys predominantly having an α phase, predominantly having a β phase, or having a mixture of both phases. It is also possible, without having to change the processing method, to set a different grain size for a high-tensile brass alloy product by appropriately varying these elements primarily.

Use of such a base high-tensile brass alloy and the special high-tensile brass alloys derived therefrom is also advantageous in industrial processing, in particular when castings of different alloys included under the base high-tensile brass alloy are to be smelted in a rapidly alternating sequence. Since the alloys all contain the same alloy elements, the risk of contamination, and thus of unknowingly altering the alloy properties by contamination, is reduced to a minimum.

In addition to the hard phases, the hardness and the toughness of the alloy have a significant influence on the properties of the friction layer. The alloy according to the invention is characterized by a remarkably wide range of achievable mechanical parameters, so that the yield strength, tensile strength, elongation at break, hardness, and toughness may be set independently of one another, in an improved manner compared to alloys used heretofore for friction applications, by the selection of the processing operations after the alloy casting. An alloy product selected specifically for the requirements of the application may be obtained by the following processing operations after melting of the components according to the invention:

hot forming directly after the alloy casting, in particular continuous casting, without an additional treatment step, or followed solely by a final annealing step, extrusion directly followed by cold forming, followed by a final annealing step, extrusion with subsequent intermediate annealing prior to carrying out cold forming and a final annealing step.

At this point it should be emphasized once again that the individual special high-tensile brass alloys included under the base high-tensile brass alloy described above may all be produced using the same method, so that the heat treatment may be carried out in the same way.

A first special high-tensile brass alloy which has become established under the base high-tensile brass alloy described above, with a particular improvement in the desired properties, has the following composition:

58-64 wt % Cu;
5-7 wt % Mn;
3-5 wt % Ni;
4-6 wt % Al;
0.5-2.5 wt % Si;
0.1-1.5 wt % Fe;
≤0.3 wt % Sn;
≤0.5 wt % Pb;
and the remainder Zn together with unavoidable impurities.

A high-tensile brass alloy according to this first embodiment is characterized by particularly good emergency running properties when used as a bearing material. This is attributed to a large area proportion of intermetallic phases in the alloy. A plurality of flatly extending contact points having high abrasion resistance which extend up to the adsorption layer of the accumulated lubricant components are thus present on the friction surface. At the same time, the flat characteristic of the intermetallic phases which is present according to the invention increases the strength of the reaction layer, composed of reaction products of the adsorption layer components and alloy components near the surface, which forms beneath the adsorption layer. The tendency of individual hard phase particles to flake off, and the associated notch effect, are reduced due to the high area proportion of the intermetallic phases. Overall, this results in a bearing material having high wear resistance.

Furthermore, the first embodiment is characterized by particularly advantageous mechanical properties. Characterizing features are great hardness, high yield strength, and high tensile strength with a likewise advantageously high elongation at break, which may be held at relatively high values even during subsequent annealing. In addition, it has been shown that the mechanical values may be set via a hot forming step following the alloy casting, and by process control of a subsequent heat treatment. Accordingly, the advantageous mechanical values result directly from the extrusion for carrying out the hot forming and subsequent annealing for the heat treatment step, without having to carry out additional alloy strain hardening by cold forming.

One particular advantage of the alloy composition according to this first embodiment is an extrusion state having a dominant β phase. Accordingly, by a final annealing directly following the process sequence of melting and hot forming, which results in the extrusion state, the ratio of the α phase to the β phase is set so that the mechanical properties are adaptable within a wide range. By increasing the proportion of the more ductile α phase, the capability for embedding foreign particles in the friction layer of the resulting alloy product may be increased, resulting in stabilization of the adsorption layer on the friction surface in coordination with the lubricant environment present in the given application. This is particularly successful, since the relatively softer α phases lie at the grain boundaries of the comparatively hard β phase. Due to the embedding of foreign particles, the particular capability for embedding foreign particles in the relatively soft α phases causes the foreign particles to be extracted from the tribological circuit in which such a component is used. This reduces the wear on other components involved in this tribological system, in addition to a component from this alloy.

The silicides which form in this high-tensile brass alloy have a rounded shape, and therefore have only a slight notch effect.

The resulting grain size is typically 10 to 20 μm, and is therefore referred to as very fine-grained.

The above-described advantages of the first embodiment of the alloy composition according to the invention are particularly pronounced for the following alloy ranges:

60-62 wt % Cu;
5.8-6.2 wt % Mn;
4.3-4.7 wt % Ni;
4.9-5.1 wt % Al;
1.3-1.7 wt % Si;
0.9-1.1 wt % Fe;
≤0.1 wt % Sn;
≤0.1 wt % Pb;
and the remainder Zn together with unavoidable impurities.

A second special high-tensile brass alloy included under the above-described base high-tensile brass alloy results when the high-tensile brass alloy has the following composition:
60-66 wt % Cu;
1-2.5 wt % Mn;
4-6 wt % Ni;
1-2.5 wt % Al;
1-3 wt % Si;
0.1-1 wt % Fe;
≤0.5 wt % Sn;
≤0.5 wt % Pb;
and the remainder Zn together with unavoidable impurities.

The alloy composition according to the second embodiment is characterized by well adjustable abrasive wear behavior. Depending on the static and dynamic friction loads that are present, as well as the selection of the lubricant and of the counter friction surface, the abrasive wear may be adapted to the application in question in that the phase proportions for the α phase and the β phase of the alloy matrix are settable within a wide interval. The β phase proportion has greater hardness and abrasion resistance.

The predominant α proportion in the extrusion state results in a high-tensile brass alloy which is cold-formable directly from the extrusion state. Annealing after the extrusion is thus dispensed with. Even without this intermediate step, during cold forming, in particular during cold drawing, a degree of deformation may be achieved which is remarkably high compared to similarly high-alloyed high-tensile brasses. Increased withdrawal rates during the cold forming result in a comparatively high yield strength and improved strength. The mechanical properties of the resulting alloy product are settable within a particularly broad range in the second embodiment of the invention.

The selected alloy composition of the second embodiment, despite the comparatively high silicon content of 2.0-2.5 wt %, is characterized by advantageous processing properties which are not present in comparative alloys having a correspondingly high silicon content. The lower limit value for the silicon proportion selected according to the invention has been set in such a way that an alloy with high strength results. The upper limit of the added silicon is determined in such a way that the surface tension during casting does not increase enough so that crack formation occurs.

In addition, this embodiment of the alloy composition according to the invention is particularly advantageous due to the fact that the silicon proportion is not completely bound in the form of silicides, and thus, into the hard phases. Rather, free silicon has been detectable in the alloy matrix. This influences the layer structure in the resulting alloy product, under friction load in a lubricant environment, in such a way that, although the reaction rate is reduced, a more stable and wide-ranging oil-tolerant adsorption layer results.

The β phase is contained in the α phase in an island-like manner. This has favorable effects on isotropization in terms of the strength of the product manufactured from this alloy. This means that the strength that is set is relatively independent of direction.

This special high-tensile brass alloy and the products manufactured therefrom are also very fine-grained, and have a typical grain size between 10 and 20 μm.

The above-described advantages of the second embodiment of the alloy composition according to the invention are particularly pronounced for the following alloy ranges:
63-65 wt % Cu;
1.8-2.2 wt % Mn;
4.8-5.2 wt % Ni;
1.9-2.1 wt % Al;
2.0-2.5 wt % Si;
0.2-0.4 wt % Fe;
≤0.1 wt % Sn;
≤0.1 wt % Pb;
and the remainder Zn together with unavoidable impurities.

A third special high-tensile brass alloy included under the above-described base high-tensile brass alloy, having advantageously high mechanical wear resistance, may be represented by the following composition:
58-64 wt % Cu;
1.5-3.5 wt % Mn;
0.1-1 wt % Ni;
2-4 wt % Al;
0.1-1 wt % Si;
≤0.5 wt % Fe;
≤0.5 wt % Sn;
≤0.5 wt % Pb;
and the remainder Zn together with unavoidable impurities.

The observed high mechanical wear resistance is attributed to the presence of elongated intermetallic phases which show a good tendency toward a longitudinal orientation in the extrusion direction. The bearing surface of the alloy product resulting from the high-tensile brass alloy according to the third embodiment is then designed in such a way that the friction load direction extends substantially in parallel to the longitudinal orientation of the intermetallic phases. The preferably elongated design of the silicides, primarily the Mn silicides, has the function of shielding the matrix from wearing load.

The third embodiment is also characterized by good adjustability of the ratio of the α phase to the β phase in the alloy matrix. The abrasive wear behavior may thus be adapted directly to the application.

In addition, a comparatively high yield strength and a high achievable strength result from the selectable basic structure with regard to the α/β phase proportions. Furthermore, remarkably broad adjustability of the mechanical properties of the alloy product which results after the processing operation has been demonstrated. Accordingly, advantageously good adaptability to the conditions of the particular friction application present is provided.

The resulting grain size is between 100 and 300 μm, and is relatively large-grained compared to the two special high-tensile brass alloys described above. However, this is advantageous for machining of a semi-finished product manufactured from this alloy.

The above-described advantages of the third embodiment of the alloy composition according to the invention are particularly pronounced for the following alloy ranges:
58-64 wt % Cu;
1.5-3.5 wt % Mn;
0.1-1 wt % Ni;

2-4 wt % Al;
0.1-1 wt % Si;
≤0.5 wt % Fe;
≤0.5 wt % Sn;
≤0.5 wt % Pb;
and the remainder Zn together with unavoidable impurities.

In the three special high-tensile brass alloys described above, the Mn/Al ratio is preferably set between 0.9 and 1.1, preferably approximately 1.

A fourth special high-tensile brass alloy included under the mentioned base alloy has the following alloy composition:
58-64 wt % Cu;
1-3 wt % Mn;
1-3 wt % Ni;
0.1-1 wt % Al;
0.2-1.5 wt % Si;
0.1-1.5 wt % Fe;
≤0.5 wt % Sn;
≤0.5 wt % Pb;
and the remainder Zn together with unavoidable impurities.

This high-tensile brass alloy is characterized by a particularly high elongation at break, and strength that is still sufficient. In addition, particularly high wear resistance is present, which is attributed to a single-row structure of the brass matrix. Furthermore, it has been found that high toughness in combination with the above-mentioned advantageous mechanical properties may also be achieved. This property is based on the fact that the matrix is composed predominantly of the α phase. The β phases that are present form small islands. The rounded silicides are relatively insensitive to notch effects.

The above-described advantages of the fourth embodiment of the alloy composition according to the invention are particularly pronounced for the following alloy ranges:
60-62 wt % Cu;
1.6-2.0 wt % Mn;
1.8-2.2 wt % Ni;
0.2-0.4 wt % Al;
0.65-0.95 wt % Si;
0.9-1.1 wt % Fe;
≤0.1 wt % Sn;
≤0.1 wt % Pb;
and the remainder Zn together with unavoidable impurities.

In addition to the exemplary aspects and embodiments described above, further aspects and embodiments will become apparent by reference to the accompanying drawings forming a part of this specification.

BRIEF DESCRIPTION OF THE DRAWINGS

The invention is further explained below based on exemplary embodiments, with reference to the following figures:

FIG. 1: shows a light micrograph of the extrusion state of a first embodiment of the high-tensile brass according to the invention, in cross section with a 100× magnification, FIG. 2: shows a light micrograph of the extrusion state from FIG. 1, with a 500× magnification, FIG. 3: shows a light micrograph of the first embodiment of after soft annealing at 450° C., in cross section with a 50× magnification, FIG. 4: shows a light micrograph of the soft annealing state of the first embodiment from FIG. 3, in cross section with a 500× magnification.

Before further explaining the disclosed embodiments of the present invention, it is to be understood that the invention is not limited in its application to the details of the particular arrangements shown, since the invention is capable of other embodiments. While exemplary embodiments are illustrated in reference to the figures, it is intended that the embodiments and figures disclosed herein are to be considered illustrative rather than limiting. Also, the terminology used herein is for the purpose of description and not of limitation.

DETAILED DESCRIPTION

As described above, a first embodiment of the high-tensile brass according to the invention comprises 58-64 wt % Cu; 5-7 wt % Mn; 3-5 wt % Ni; 4-6 wt % Al; 0.5-2.5 wt % Si; 0.1-1.5 wt % Fe; ≤0.3 wt % Sn; ≤0.5 wt % Pb; and the remainder Zn together with unavoidable impurities. In the cast state, intermetallic phases (IMP) which are embedded in a fine brass matrix structure are present in the high-tensile brass according to the first embodiment. In addition, the cast structure has no significant structural variation, either in the cross section or over the longitudinal extent of the cast strand. The investigated sample of high-tensile brass alloy according to this first embodiment has the following composition (data in wt %):

| Cu | Zn | Pb | Sn | Fe | Mn | Ni | Al | Si | As | Sb | P | Cr |
|---|---|---|---|---|---|---|---|---|---|---|---|---|
| 61.0 | Remainder | 0.005 | 0.005 | 1.0 | 5.9 | 4.5 | 5.0 | 1.5 | 0.02 | — | 0.005 | 0.03 |

The aluminum content for the first embodiment of the high-tensile brass according to the invention, which is selected to be relatively high, suppresses the conversion of the β phase to the α phase during cooling of the alloy in the cast state, so that, despite the relatively high zinc proportion that is selected, a dominant β phase, not an α/β mixed phase, results.

Due to the extrusion which follows the casting, an extrusion state is achieved, shown as light micrographs in FIGS. 1 and 2 with cross section magnifications of 100× and 500×, respectively. The structure, which is significantly refined compared to the casting, has a matrix with a uniform β phase in which intermetallic phases, which are divided into two average sizes, are intercalated. The larger intermetallic phases are present at the grain boundaries and also in the interior of the grains, while the smaller intermetallic phases are present only at the grain boundaries. Based on longitudinal sections, not illustrated in detail, it was possible to determine that the brass matrix as well as the intermetallic phases have only a relatively weak orientation in the extrusion direction.

Figure 6:
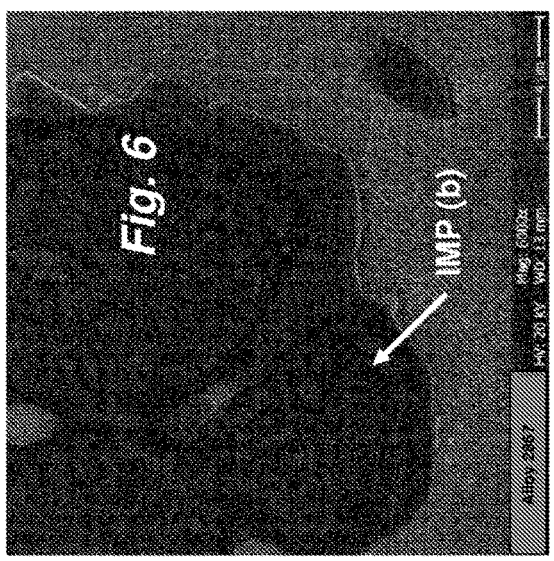
FIG. 6: further shows a scanning electron micrograph with secondary electron contrast of the first embodiment, in the extrusion state with a 6000× magnification.
Figure 5:
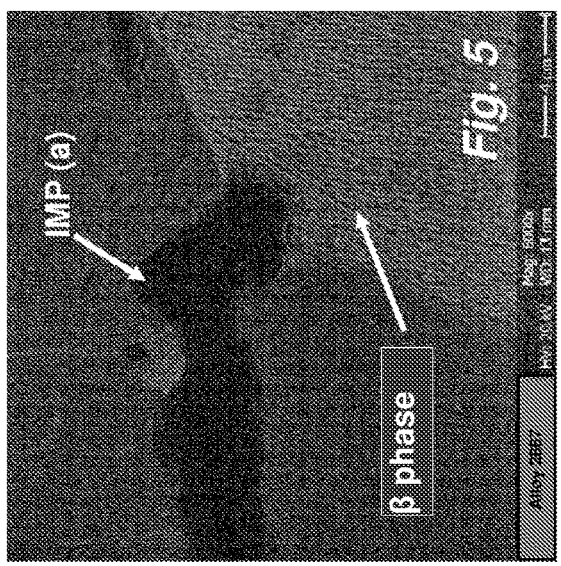
FIG. 5: shows a scanning electron micrograph with secondary electron contrast of the first embodiment, in the extrusion state with a 6000× magnification.

The alloy according to the first embodiment was characterized in the extrusion state by scanning electron micrographs and EDX analyses. FIGS. 5 and 6 show examples of scanning electron microscopy images with secondary electron contrast, with a 6000× magnification; the contrasting dark region demonstrates flat intermetallic phases having two different average sizes. The EDX measurements showed that the chemical composition of the intermetallic phases is (Fe, Mn, Ni) mixed silicides, predominantly manganese mixed silicides $Mn_5Si_3$, $Mn_5Si_2$, $Mn_6Si$, or $Mn_{44.1}Si_{8.9}$.

For setting the mechanical properties, the extrusion product of the high-tensile brass alloy according to the first embodiment may be subjected to heat treatment in the form of soft annealing at a temperature of 450° C., whereby a maximum α phase proportion of 14% is achievable. The soft annealing state is illustrated by the cross-sectional light micrographs shown in FIGS. 3 and 4. Reduced solubility of the α phase is shown at lower and higher annealing temperatures. It was also found that the α phase which forms during soft annealing at 450° C. is present primarily at the grain boundaries.

With regard to the mechanical properties, high-tensile brass according to the first embodiment in the extrusion state has a 0.2% yield strength of 760-810 MPa, a tensile strength $R_m$ of 780-920 MPa, and an elongation at break of 1.5-3%. An adjustment may be made to the required mechanical properties of a high-tensile brass product as a function of the selected temperature control during the annealing and an optional final annealing. In the alloy end state, which is set without cold forming subsequent to the heat treatment, the high-tensile brass alloy according to the first embodiment achieves high mechanical strength.

Figure 8:
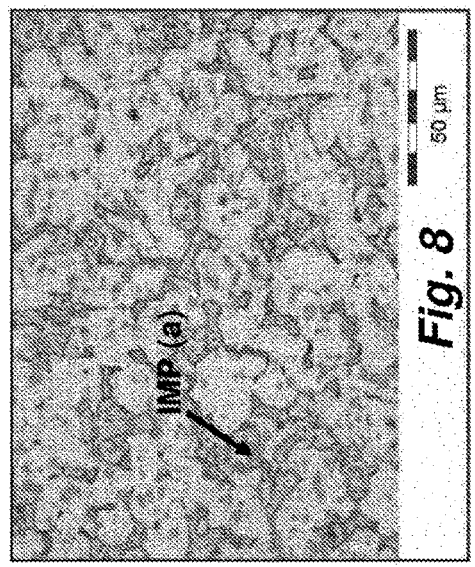
FIG. 8: shows the extrusion state of the second embodiment from FIG. 7, as a light micrograph with a 500× magnification.
Figure 7:
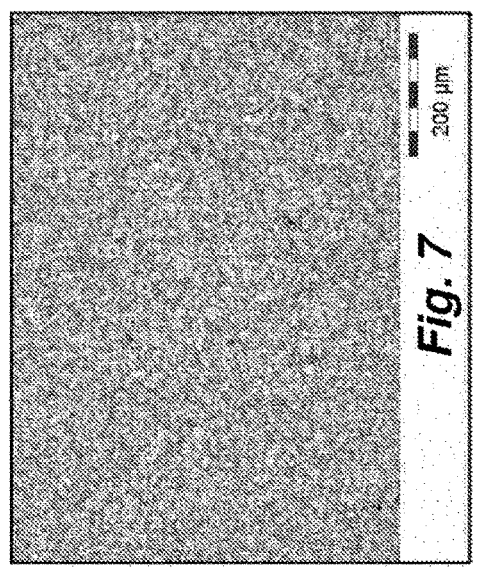
FIG. 7: shows a light micrograph of the extrusion state of a second embodiment of the high-tensile brass according to the invention, in cross section with a 50× magnification.

As described above, a second embodiment of the high-tensile brass according to the invention comprises 60-66 wt % Cu; 1-2.5 wt % Mn; 4-6 wt % Ni; 1-2.5 wt % Al; 1-3 wt % Si; 0.1-1 wt % Fe; ≤0.5 wt % Sn; ≤0.5 wt % Pb; and the remainder Zn together with unavoidable impurities. For the second embodiment, intermetallic phases (IMP) occur in the cast state. In the extrusion state, illustrated in the light micrographs in FIGS. 7 and 8, a predominant α phase with a β phase portion having an island-like distribution results. The intermetallic phase is present in the α and β portions of the matrix; a wide-ranging size distribution of the hard phases having a rounded shape has been determined. Specifically, the investigated sample according to the second embodiment of the high-tensile brass alloy has the following composition (data in wt %):

| Cu | Zn | Pb | Sn | Fe | Mn | Ni | Al | Si | As | Sb | P | Cr |
|---|---|---|---|---|---|---|---|---|---|---|---|---|
| 64.0 | Remainder | 0.1 | 0.1 | 0.3 | 2.0 | 5.0 | 2.0 | 2.2 | — | — | — | 0.03 |

Longitudinal sections, not illustrated in detail, have shown that the brass matrix has only a relatively weak orientation, and the intermetallic phases have no orientation, in the extrusion direction.

Figure 9:
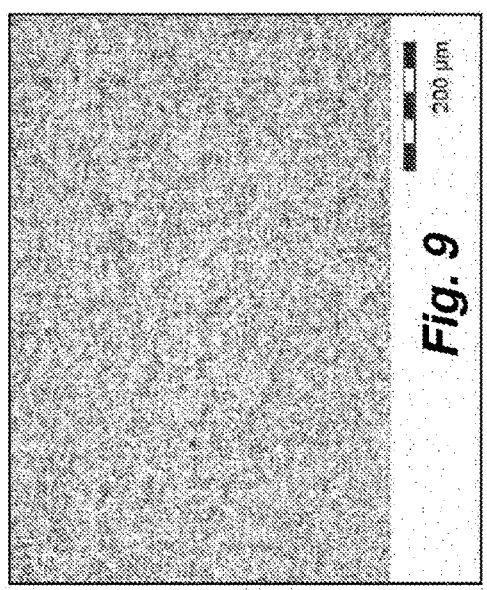
FIG. 9: shows a light micrograph of the second embodiment after soft annealing at 450° C., in cross section with a 50× magnification.
Figure 10:
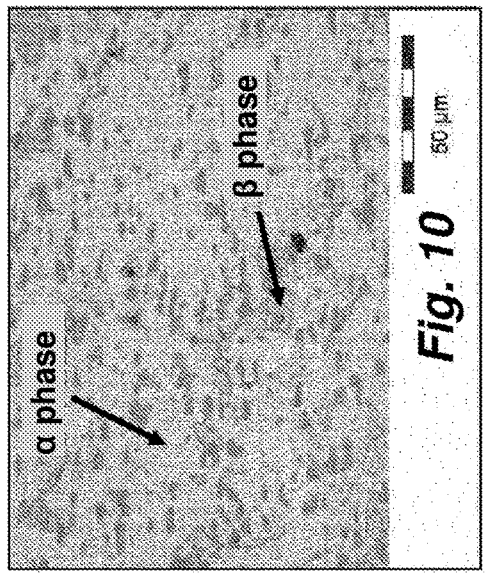
FIG. 10: shows a light micrograph of the soft annealing state of the second embodiment from FIG. 9, in cross section with a 500× magnification.

The extrusion product of the high-tensile brass alloy according to the second embodiment is treated by soft annealing in a subsequent process step; the soft annealing state is illustrated by the cross-sectional light micrographs shown in FIGS. 9 and 10. The structure after the soft annealing at an annealing temperature of 450° C.-550° C. is dominated by the α phase, and has island-like β phase portions.

The soft annealing is followed by cold forming, the degree of deformation typically being selected in the range of a 5-15% reduction in cross section. Lastly, a final annealing is carried out; for an annealing temperature of 450° C.-550° C., a predominant α phase portion, together with a β phase portion that is increased compared to the soft annealing state, results.

Figure 11:
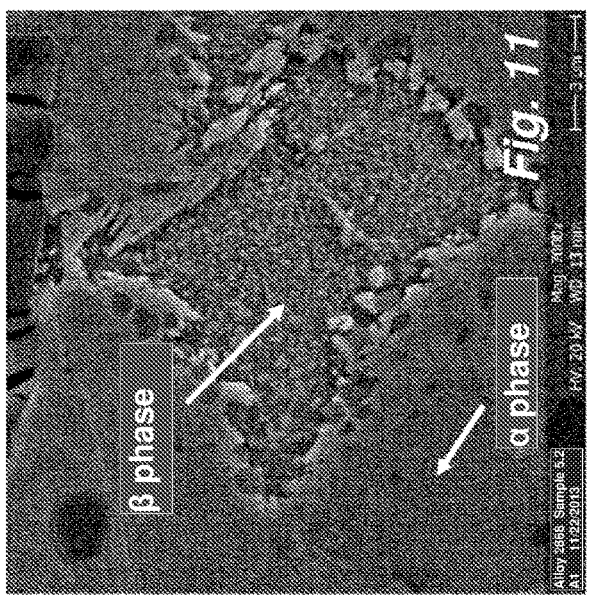
FIG. 11: shows a scanning electron micrograph with secondary electron contrast of the second embodiment, in the alloy end state with a 7000× magnification.
Figure 12:
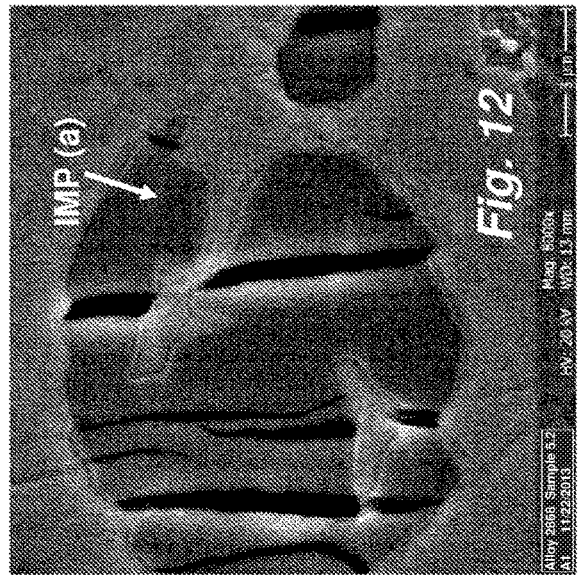
FIG. 12: further shows a scanning electron micrograph with secondary electron contrast of the second embodiment, in the alloy end state with a 7000× magnification.

The alloy according to the second embodiment was characterized in the alloy end state by scanning electron micrographs and EDX analyses. FIGS. 11 and 12 show examples of scanning electron microscopy images of the α/β mixed matrix and the intermetallic phases. The EDX measurements showed that the chemical composition of the intermetallic phases is (Fe, Mn, Ni) mixed silicides, predominantly manganese mixed silicides $Mn_5Si_3$, $Mn_5Si_2$, $Mn_6Si$, or $Mn_{44.1}Si_{8.9}$.

With regard to the mechanical properties, high-tensile brass according to the second embodiment in the extrusion state has a 0.2% yield strength of 280-300 MPa, a tensile strength $R_m$ of 590-630 MPa, and an elongation at break of 9-14%. In the end alloy state, a 0.2% yield strength of 450-650 MPa, a tensile strength $R_m$ of 570-770 MPa, and an elongation at break of 4-9.4% are present.

Figure 14:
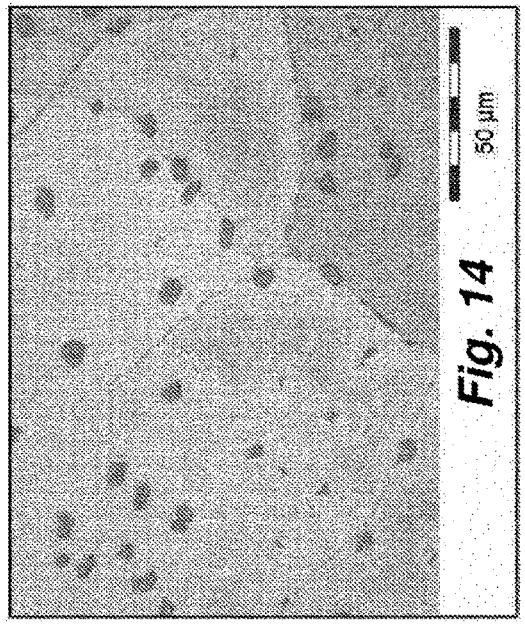
FIG. 14: shows the extrusion state of the third embodiment from FIG. 13, as a light micrograph with a 500× magnification.
Figure 13:
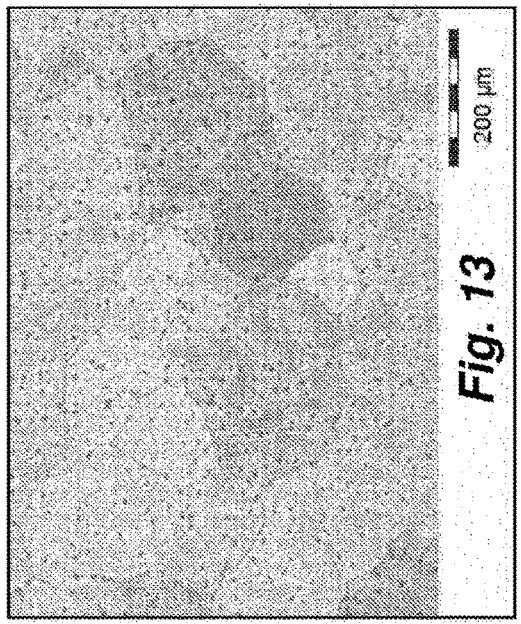
FIG. 13: shows a light micrograph of the extrusion state of a third embodiment of the high-tensile brass according to the invention, in cross section with a 100× magnification.

As described above, a third embodiment of the high-tensile brass according to the invention comprises 58-64 wt % Cu; 1.5-3.5 wt % Mn; 0.1-1 wt % Ni; 2-4 wt % Al; 0.1-1 wt % Si; ≤0.5 wt % Fe; ≤0.5 wt % Sn; ≤0.5 wt % Pb; and the remainder Zn together with unavoidable impurities. In the cast state for the third embodiment, intermetallic phases are present which in the extrusion state have been determined as rounded, elongated hard phases inside the grain. The alloy matrix in the extrusion state is formed by a β phase. The extrusion state is illustrated in the light micrographs of FIGS. 13 and 14. Specifically, the investigated sample according to the third embodiment of the high-tensile brass alloy has the following composition (data in wt %):

| Cu | Zn | Pb | Sn | Fe | Mn | Ni | Al | Si | As | Sb | P | Cr |
|---|---|---|---|---|---|---|---|---|---|---|---|---|
| 61.0 | Remainder | 0.05 | 0.005 | 0.05 | 2.3 | 0.4 | 3.0 | 0.6 | — | — | 0.02 | 0.013 |

It is apparent from longitudinal sections, not illustrated in detail, that the brass matrix has only a relatively weak orientation in the extrusion direction. In contrast, there is a distinct orientation of intermetallic phases in parallel to the extrusion direction.

The intermetallic phases inside the grain represent a single phase; an average length of ≤10 μm was measured. The chemical composition of the intermetallic phases was determined from EDX measurements, and showed mixed silicides, primarily manganese silicides in the form of $Mn_5Si_3$ and $Mn_5Si_2$.

Figure 16:
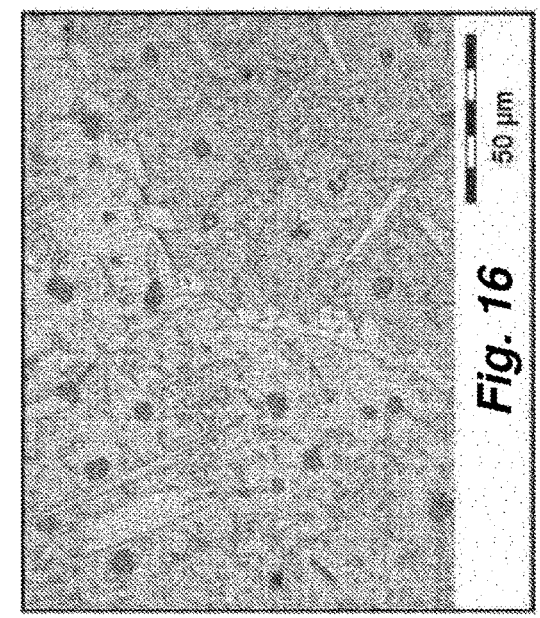
FIG. 16: shows a light micrograph of the soft annealing state of the third embodiment from FIG. 15, in cross section with a 500× magnification.
Figure 15:
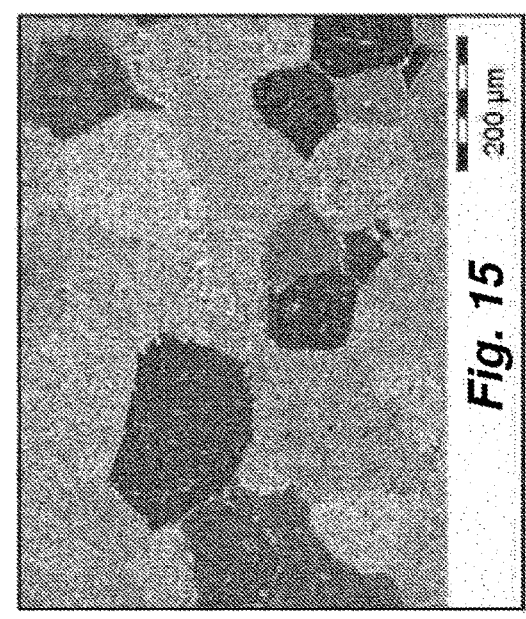
FIG. 15: shows a light micrograph of the third embodiment after soft annealing at 450° C., in cross section with a 50× magnification.
Figure 17:
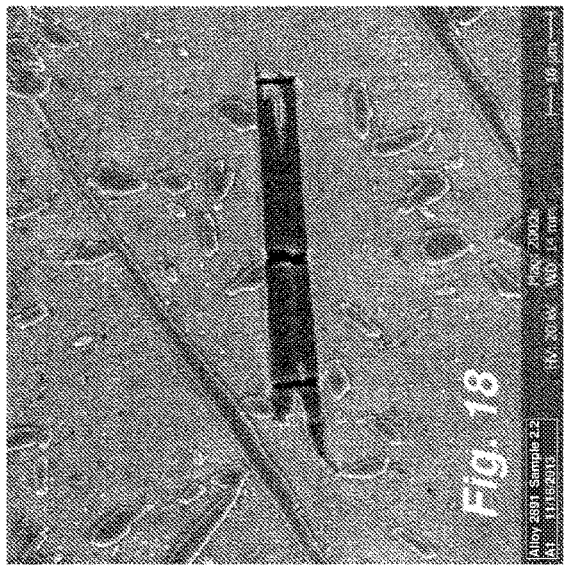
FIG. 17: shows a scanning electron micrograph with secondary electron contrast of the extrusion state of the third embodiment, with a 7000× magnification.

Starting from the extrusion state, the high-tensile brass alloy according to the third embodiment is treated by soft annealing in a subsequent process step; the soft annealing state is illustrated by the cross-sectional light micrographs shown in FIGS. 15 and 16. A predominant β phase results for a soft annealing temperature of 450° C.; α phase portions with a random distribution are present in the region of the grain boundaries and inside the grains. Increasing the soft annealing temperature to 550° C. results in a uniform β phase.

The soft annealing is followed by cold forming, the degree of deformation typically having been selected in the range of a 5-15% reduction in cross section. Lastly, a final annealing is carried out; for an annealing temperature of 450° C., a continued predominant β phase portion and an α phase portion that is greatly increased compared to the soft annealing state are present. In comparison, at a final annealing temperature of 550° C. no significant change in the alloy structure occurs compared to the soft-annealed state.

With regard to the mechanical properties, high-tensile brass according to the third embodiment in the extrusion state has a 0.2% yield strength of 480-550 MPa, a tensile strength $R_m$ of 720-770 MPa, and an elongation at break of 9.3-29%. In the end alloy state, a 0.2% yield strength of 570-770 MPa, a tensile strength $R_m$ of 750-800 MPa, and an elongation at break of 7.5-12% are present.

Figure 20:
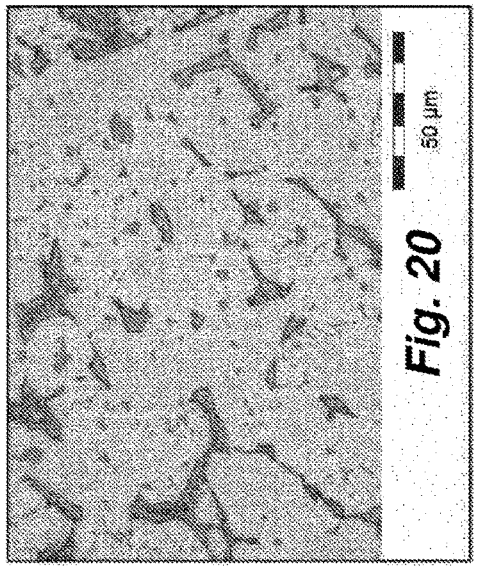
FIG. 20: shows the extrusion state of the fourth embodiment from FIG. 19, as a light micrograph with a 500× magnification.
Figure 18:
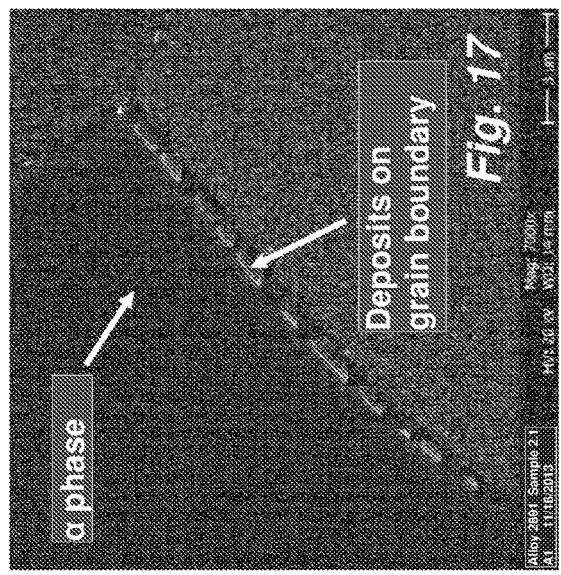
FIG. 18: shows a scanning electron micrograph with secondary electron contrast of the alloy end state of the third embodiment, with a 2000× magnification.
Figure 19:
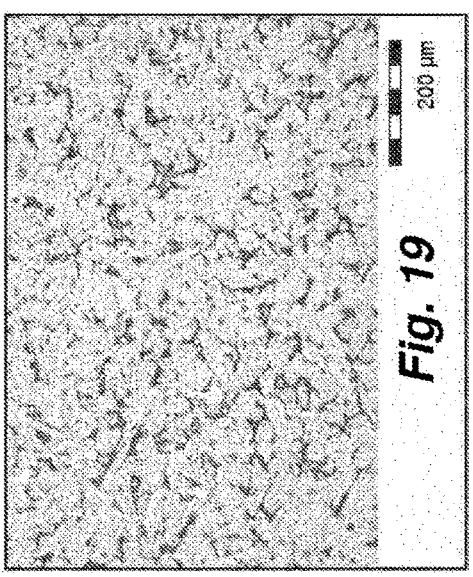
FIG. 19: shows a light micrograph of the extrusion state of a fourth embodiment of the high-tensile brass alloy according to the invention, in cross section with a 100× magnification.

As described above, a fourth embodiment of the high-tensile brass according to the invention comprises 58-64 wt % Cu; 1-3 wt % Mn; 1-3 wt % Ni; 0.1-1 wt % Al; 0.2-1.5 wt % Si; 0.1-1.5 wt % Fe; ≤0.5 wt % Sn; ≤0.5 wt % Pb; and the remainder Zn together with unavoidable impurities. For this fourth embodiment, in the cast state intermetallic phases form which in the extrusion state have been determined as rounded hard phases present inside the grain of an α phase. In the extrusion state, illustrated in the light micrographs in FIGS. 19 and 20, a predominant α phase was found, with additional β phase portions present at the grain boundaries of the α phase. Based on longitudinal sections, not illustrated in detail, for the brass matrix this results in a distinct orientation in the extrusion direction, while the intermetallic phases are only weakly oriented. Specifically, the investigated sample according to the fourth embodiment of the high-tensile brass alloy has the following composition (data in wt %):

| Cu | Zn | Pb | Sn | Fe | Mn | Ni | Al | Si | As | Sb | P | Cr |
|---|---|---|---|---|---|---|---|---|---|---|---|---|
| 61.0 | Remainder | 0.02 | 0.05 | 0.5 | 1.8 | 2.0 | 0.3 | 0.8 | — | — | — | — |

Figure 21:
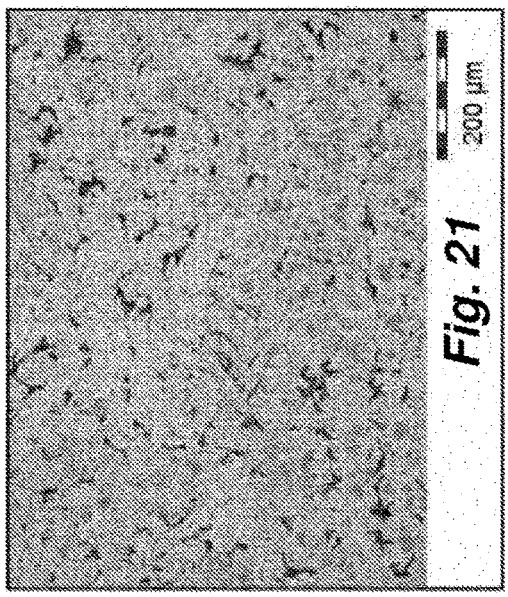
FIG. 21: shows a light micrograph of the fourth embodiment after soft annealing at 450° C., in cross section with a 50× magnification.
Figure 22:
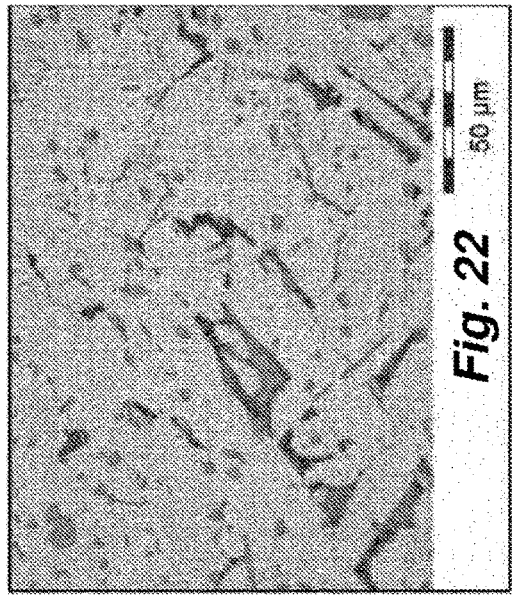
FIG. 22: shows a light micrograph of the soft annealing state of the fourth embodiment from FIG. 21, in cross section with a 500× magnification.
Figure 23:
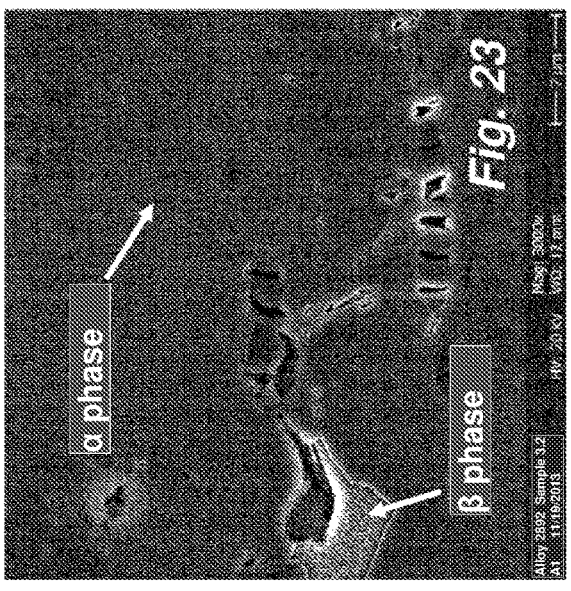
FIG. 23: shows a scanning electron micrograph with secondary electron contrast of the alloy end state of the fourth embodiment, with a 3000× magnification.
Figure 24:
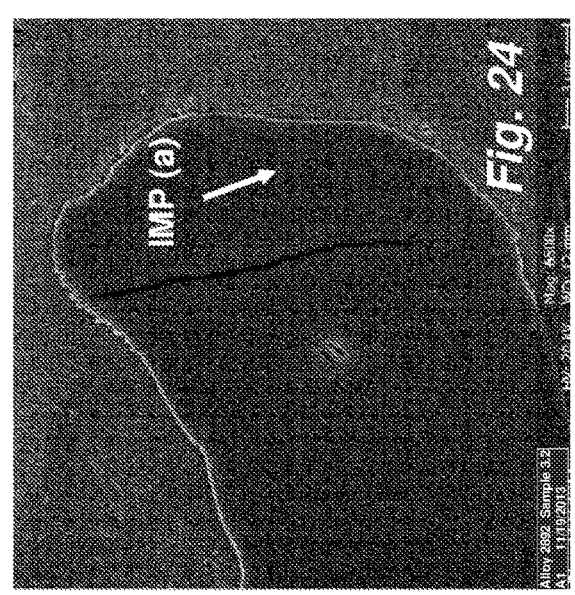
FIG. 24: shows a scanning electron micrograph with secondary electron contrast of the alloy end state of the fourth embodiment of, with a 6500× magnification.

The extrusion product of the high-tensile brass alloy according to the fourth embodiment is treated by soft annealing in a subsequent process step; the soft annealing state is illustrated by the cross-sectional light micrographs shown in FIGS. 21 and 22. For a soft annealing temperature of 450° C., a dominant α phase with island-like β phase portions results. An increased soft annealing temperature in the range of 550° C. results in a uniform α phase, with decreased island-like β phase portions compared to the lower soft annealing temperature.

The soft annealing is followed by cold forming, the degree of deformation typically having been selected in the range of a 5-15% reduction in cross section. Lastly, a final annealing is carried out; the alloy structure is not significantly different from the soft-annealed state.

For the alloy end state, the intermetallic phases inside the grains of the base matrix have single-phase structures with an average length of ≤7 μm; a polycrystalline structure was demonstrated. Based on the EDX measurements, with regard to the chemical composition of the intermetallic phases it was shown that in addition to (Fe, Mn, Ni) mixed silicides, in particular iron silicides of the form $Fe_5Ni_3Si_2$ and $Fe_3Si$ are present. In addition, hard phase deposits having an average size ≤0.2 μm were found at the grain boundaries and in the β phase.

With regard to the mechanical properties, high-tensile brass according to the fourth embodiment in the extrusion state has a 0.2% yield strength of 480-550 MPa, a tensile strength $R_m$ of 430-470 MPa, and an elongation at break of 22-42%. In the end alloy state, a 0.2% yield strength of 350-590 MPa, a tensile strength $R_m$ of 400-650 MPa, and an elongation at break of 3-19% are present.

While a number of exemplary aspects and embodiments have been discussed, those of skill in the art will recognize certain modifications, permutations, additions and sub-combinations are possible. It is intended that the following appended claims are interpreted to include all such modifications, permutations, additions and sub-combinations, as they are within the true spirit and scope of the claims. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

The invention claimed is:

1. A high-tensile brass alloy comprising
60-62 wt % Cu;
2.1-2.5 wt % Mn;
0.2-0.6 wt % Ni;
2.9-3.1 wt % Al;
0.35-0.65 wt % Si;
<0.1 wt % Fe;
<0.1 wt % Sn;
<0.1 wt % Pb;
and the remainder Zn together with unavoidable impurities.

2. A high-tensile brass alloy product having an alloy composition according to claim 1, wherein the high-tensile brass alloy product is adjusted by hot forming, annealing, and cold drawing in such a way that the 0.2% yield strength $R_{P0.2}$ is in the range of 570-770 MPa, the tensile strength $R_m$ is in the range of 750-800 MPa, and the elongation at break $A_5$ is in the range of 7.5-12%.

3. The high-tensile brass alloy product of claim 2, wherein the high-tensile brass alloy product is a component that is designed for a friction load that is variable over time.

4. The high-tensile brass alloy product of claim 3, wherein the high-tensile brass alloy product is a bearing bush, a slide shoe, a worm gear, or an axial bearing for a turbocharger.

* * * * *